3 Sheets—Sheet 1.

T. W. BRACHER.
Sweat-Bands for Hats and Caps.

No. 210,489. Patented Dec. 3, 1878.

Witnesses.
Otto Hufeland
W. C. Hauff

Inventor
Thomas W. Bracher
by VanSantvoord & Hauff
his attorneys.

3 Sheets—Sheet 2.
T. W. BRACHER.
Sweat-Bands for Hats and Caps.
No. 210,489. Patented Dec. 3, 1878.
Fig.7.
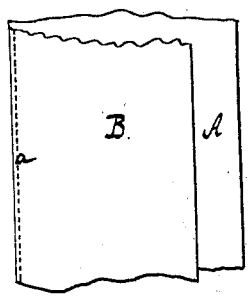
Fig.8.
Fig.9.
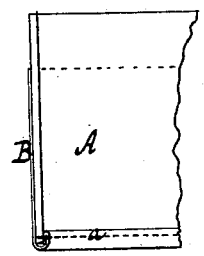
Fig.10.
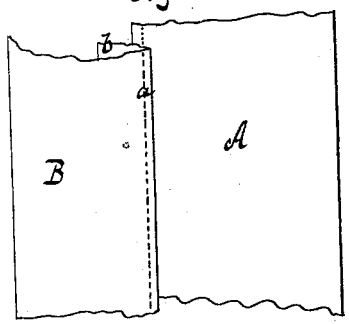
Fig.11.
Fig.12.
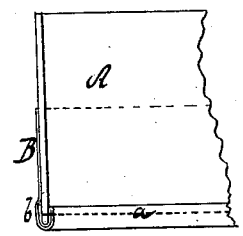
Fig.13.
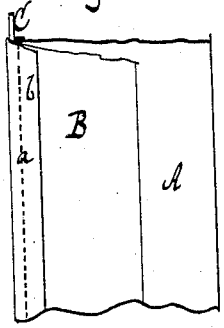
Fig.14.
Fig.15.
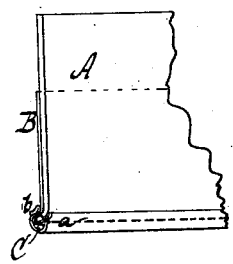
Witnesses
Otto Aufeland
W. C. Hauff.
Inventor
Thomas W. Bracher.
by Van Santvoord & Hauff
his attys.
N. PETERS, PHOTO-LITHOGRAPHER, WASHINGTON, D. C.

3 Sheets—Sheet 3.
T. W. BRACHER.
Sweat-Bands for Hats and Caps.
No. 210,489. Patented Dec. 3, 1878.
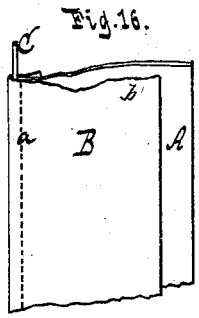
Fig. 16.
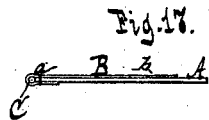
Fig. 17.
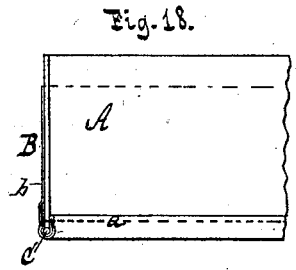
Fig. 18.
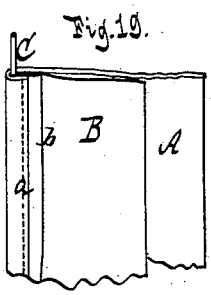
Fig. 19.
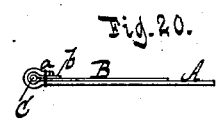
Fig. 20.
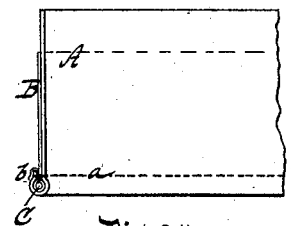
Fig. 21.
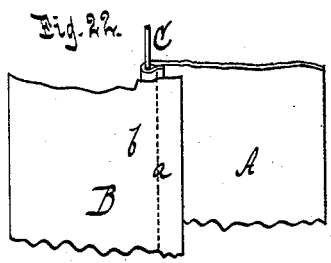
Fig. 22. Fig. 23.
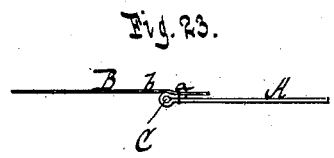
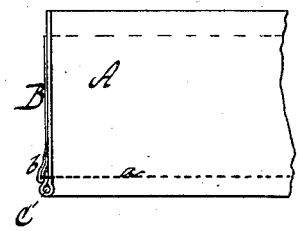
Fig. 24.
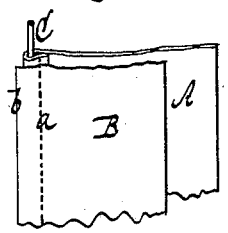
Fig. 25.
Fig. 26.
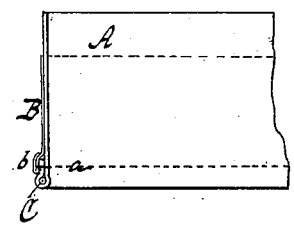
Fig. 27.
Witnesses
Otto Hufeland.
W. C. Hauff.
Inventor.
Thomas W. Bracher
by VanSantvoord & Hauff
his attys.

UNITED STATES PATENT OFFICE

THOMAS W. BRACHER, OF NEW YORK, N. Y.

IMPROVEMENT IN SWEAT-BANDS FOR HATS AND CAPS.

Specification forming part of Letters Patent No. 210,489, dated December 3, 1878; application filed November 7, 1878.

*To all whom it may concern:*

Be it known that I, THOMAS W. BRACHER, of the city, county, and State of New York, have invented a new and useful Improvement in Sweat-Bands for Hats and Caps, which improvement is fully set forth in the following specification, reference being had to the accompanying drawings, in which—

Figure 1:
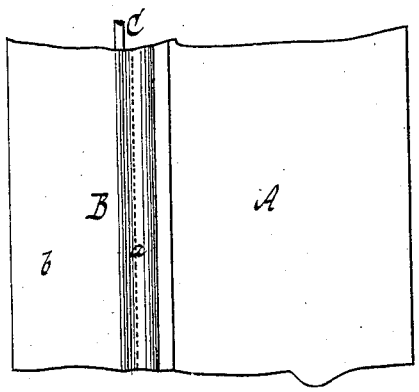
Figure 4:
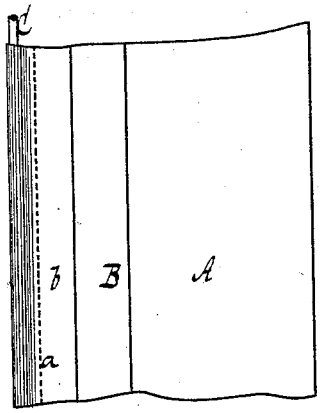
Figure 2:
Figure 5:
Figure 3:
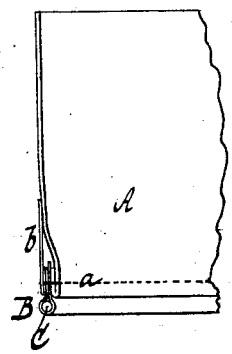
Figure 6:
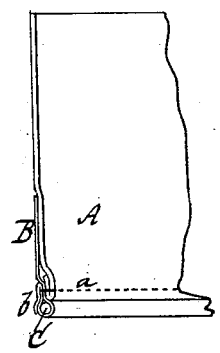

Figure 1 represents a plan of the band and the lining as placed together for the purpose of stitching. Fig. 2 is an end view of the same. Fig. 3 is a section of the sweat when completed and ready to be inserted into a hat or cap. Figs. 4, 5, and 6 are corresponding views of a modification of the same. Figs. 7, 8, and 9 are corresponding views of another modification. Figs. 10, 11, and 12 are corresponding views of another modification. Figs. 13, 14, and 15 are corresponding views of another modification. Figs. 16, 17, and 18 are corresponding views of another modification. Figs. 19, 20, and 21 are corresponding views of another modification. Figs. 22, 23, and 24 are corresponding views of another modification. Figs. 25, 26, and 27 are corresponding views of another modification.

Similar letters indicate corresponding parts.

This invention consists in a sweat composed of leather, or other equivalent soft material, and a lining of oil-cloth, or other suitable material, said lining being secured to the band by a row of stitches, and provided with a flap adapted to be folded over the row of stitches and to protect the hat-body against the perspiration which may follow the threads comprising the stitches.

In my Patent No. 206,296, dated July 23, 1878, I have described a sweat composed of a band of leather, or other equivalent soft material, and a lining of oil-silk, or other suitable material, which is connected to the band by a row of stitches, and in which the band itself is folded, so as to conceal the stitches and to prevent the perspiration to some extent to follow the threads used in producing the stitches. In this case the hat-body is not as liable to be soiled by the perspiration as it is if the stitches come in direct contact with the brow of the person wearing the hat; but since the material used for the band is not water-proof, the perspiration is liable to penetrate through the same and to follow the threads of the stitches to the hat-body. In the sweat-band which forms the subject of my present invention this difficulty is entirely obviated.

In the example shown in Figs. 1, 2, and 3, the letter A designates a band of leather, or other soft material, and B is the lining of oil-silk, or other equivalent water-proof material. This lining is folded over twice, as shown in Fig. 2, and into one of the bights is placed the reed or spring-rod C. The edge of the band A is also folded, and the two parts are placed one on top of the other, and united by a row of stitches, $a$. For the purpose of folding the band and the lining suitable gages are used, which are secured to the cloth-plate of sewing-machines, so that the whole operation can be effected with expedition. After the band and the lining have been stitched together in the manner shown in Figs. 1 and 2, the flap $b$ of the lining is folded over the stitches, as shown in Fig. 3, and it is then ready to be secured in a hat. By this arrangement the flap $b$ of the water-proof lining lies between the stitches and the body of the hat or cap, and the perspiration which may follow the stitches is effectually prevented from soiling said body.

In the example shown in Figs. 4, 5, and 6, the letter A designates the band of leather, or other equivalent soft material, and B is the lining of oil-silk, or other equivalent water-proof material, which is folded over the reed or spring-rod C. The edge of the band A is also folded, and the two parts are united by a row of stitches, $a$, as shown in Figs. 4 and 5, which pass through the lining at a distance from its edge, so as to leave a loose flap, $b$. This flap is finally turned down over the stitches, as shown in Fig. 6, and when the sweat-band is secured in a hat or cap said flap effectually protects the body of the hat or cap against the perspiration which may follow the stitches.

In the example shown in Figs. 7 to 9 no reed or spring-rod is used. The band A and the lining B are placed one on top of the other, neither of them being folded, and they are united by a row of stitches, $a$, near one of their edges, as shown in Figs. 7 and 8. The entire lining forms a flap, which is then folded over the edge of the band and over the stitches, so as to prevent the perspiration from following said stitches and to protect the body of the hat or cap effectually from being soiled.

In the example shown in Figs. 10 to 12 no reed or spring-rod is used. The band A is not folded, but the lining B is folded, and secured to the band by a row of stitches, a, as shown in Figs. 10 and 11. The main body of the lining forms a flap, which is turned over the edge of the band, (see Fig. 12,) and which, when thus folded, protects the body of the hat or cap against the perspiration which may follow the stitches.

In the example shown in Figs. 13 to 15 the reed or spring-rod is used. The band A is not folded, but the lining B is made in two sections, one of which is placed flat over the lining, while the other is folded over the edge of the band and of the first section, as shown in Fig. 14, when all the parts are secured together by a row of stitches, a. One edge of the second section forms a flap, b, which is turned down over the stitches, (see Fig. 15,) so as to protect the body of the hat or cap.

In the example shown in Figs. 16 to 18, the band A is not folded, but the lining B is folded over the edge of the band and over a reed or spring-rod, C, as shown in Fig. 17. The parts are then connected together by a row of stitches, a, and by turning the long flap b of the lining back over the edge of band A to the position shown in Fig. 18, the stitches are completely concealed, and the perspiration is effectually prevented from following said stitches and from soiling the body of the hat or cap.

In the example shown in Figs. 19 to 21, the band A is folded over the lining B, which latter is also folded so as to form the flap b. The reed or spring-rod is shown, but may be omitted. The parts are then united by a row of stitches, a, (Figs. 19 and 20,) and by turning the flap b down over the stitches, as shown in Fig. 21, the perspiration which may follow said stitches is prevented from soiling the body of the hat or cap to which said lining is secured.

In the example shown in Figs. 22 to 24, the band A is folded over the reed or spring-rod C, the lining B is placed on it, as shown in Figs. 22 and 23, and the two are united by a row of stitches, a. The flap b, formed by the main portion of the lining, is then turned up over the stitches a, as shown in Fig. 24, and when the sweat is secured in a hat or cap said flap prevents the perspiration which may follow the stitches from soiling the body of the hat or cap.

The example shown in Figs. 25 to 27 is substantially the same as that just described, with only a slight modification. The band A is folded over the reed or spring-rod C, and the lining B is placed on the band and secured thereto by a row of stitches, a, the main portion of said lining being placed flat on the inner surface of the band, as shown in Figs. 25 and 26. The flap b of the lining is then folded over the stitches a, as shown in Fig. 27, and it protects the body of the hat or cap from being soiled by the perspiration which may follow the stitches.

It will be noticed that in the three sweat-bands last described a row of stitches appears on the exposed surface of the band A, which is desirable in some cases.

I am aware that a water-proof lining has been attached to the edge of a sweat-band by means of an overseam, but this necessitates the same being visible along the edge of the sweat-band and more or less in contact with both the head of the wearer and the crown of the hat, so that the thread has a tendency to conduct perspiration to the crown of the hat; and, further, the needle-holes along the edges of the band and lining afford access of the perspiration to the crown of the hat.

What I claim as new, and desire to secure by Letters Patent, is—

A sweat for hats and caps composed of a band of leather, or other equivalent soft material, and a lining of oil-silk, or other suitable material, said lining being secured to the band by a row of stitches, and provided with a flap adapted to be folded over the row of stitches and protect the body of the hat or cap against the perspiration which may follow the threads composing the stitches, substantially as set forth.

In testimony that I claim the foregoing I hereunto set my hand and seal this 30th day of October, 1878.

T. W. BRACHER. [L. S.]

Witnesses:
W. HAUFF,
E. F. KASTENHUBER.